United States Patent [19]

Beetle

[11] 4,020,928

[45] May 3, 1977

[54] RAILROAD BRAKE SHOES WITH SEPARABLE INSERT ENGAGEABLE WITH FLANGE OF A WHEEL

[75] Inventor: Robert H. Beetle, Mountain Lakes, N.J.

[73] Assignee: Abex Corporation, New York, N.Y.

[22] Filed: May 19, 1975

[21] Appl. No.: 578,615

[52] U.S. Cl. .................. 188/237; 188/243
[51] Int. Cl.² .......................... F16D 65/04
[58] Field of Search .......... 188/237, 234, 242, 243, 188/245, 247, 248, 251 R, 251 A, 251 M, 1 A, 252, 250 B

[56] References Cited

UNITED STATES PATENTS

| | | | |
|---|---|---|---|
| 623,922 | 4/1899 | MacGregor | 188/252 |
| 924,930 | 6/1909 | Pettis | 188/252 |
| 925,170 | 6/1909 | Griffin | 188/252 |
| 1,250,513 | 12/1917 | Rote | 188/237 |
| 1,847,667 | 3/1932 | Pogue | 188/252 X |
| 2,149,952 | 3/1939 | Birch | 188/248 |
| 2,869,689 | 1/1959 | Wilson | 188/252 X |
| 2,902,752 | 9/1959 | Keating, Jr. et al. | 188/242 X |
| 2,948,361 | 8/1960 | Pogue | 188/248 X |
| 3,235,952 | 2/1966 | Arrasmith | 188/242 X |

*Primary Examiner*—Trygve M. Blix
*Assistant Examiner*—Douglas C. Butler
*Attorney, Agent, or Firm*—Kinzer, Plyer, Dorn & McEachran

[57] ABSTRACT

An insert for a railroad brake shoe having a support plate engageable complementally with a portion of the shoe back. Shoulders are provided for preventing the lateral and longitudinal displacement of the insert relative to the brake head assembly. A guide is cantilevered from one side of the support plate and so configured to generally complementally fit the flange of the wheel, thereby to guide the shoe into aligned contact with the wheel tread when the brake is applied.

10 Claims, 6 Drawing Figures

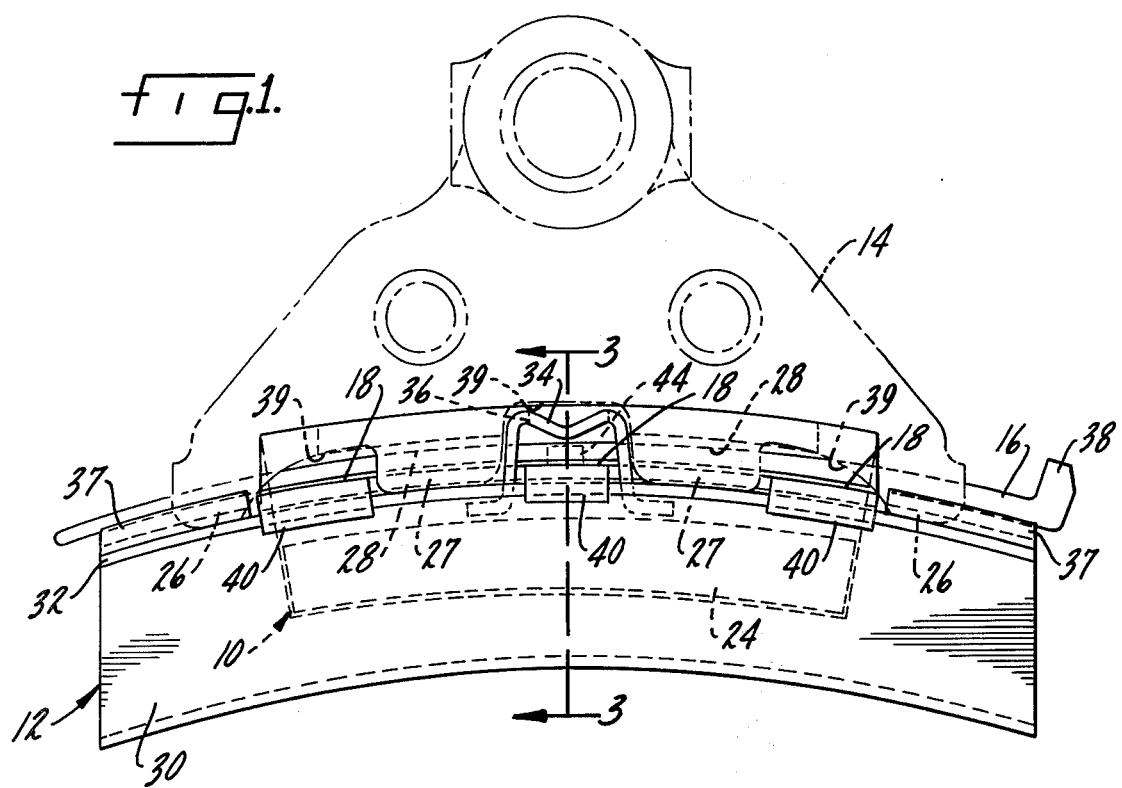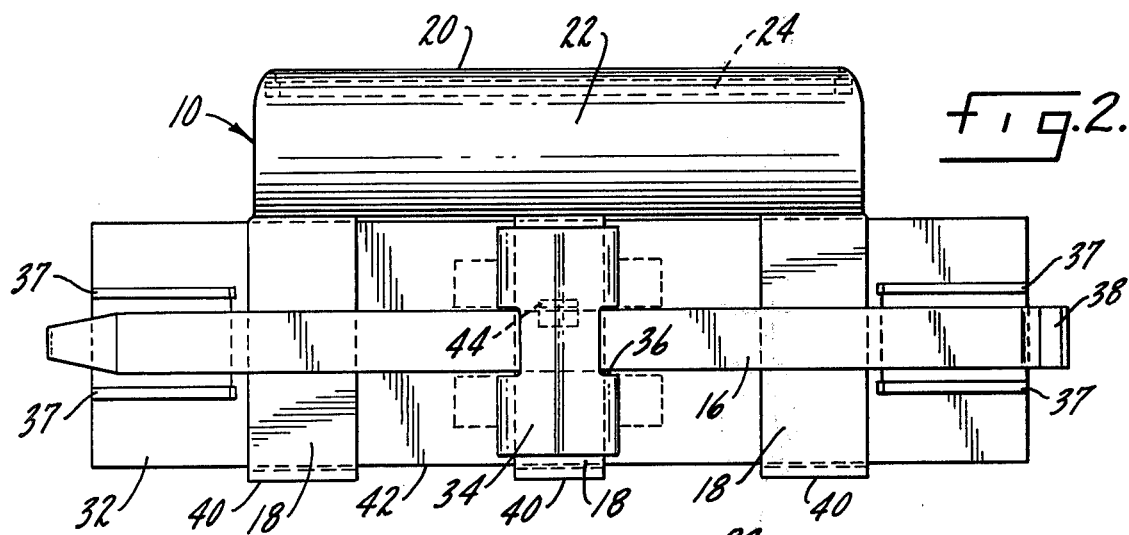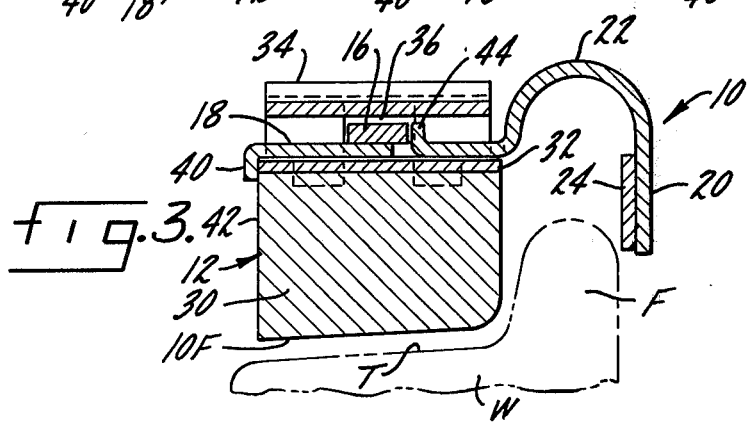

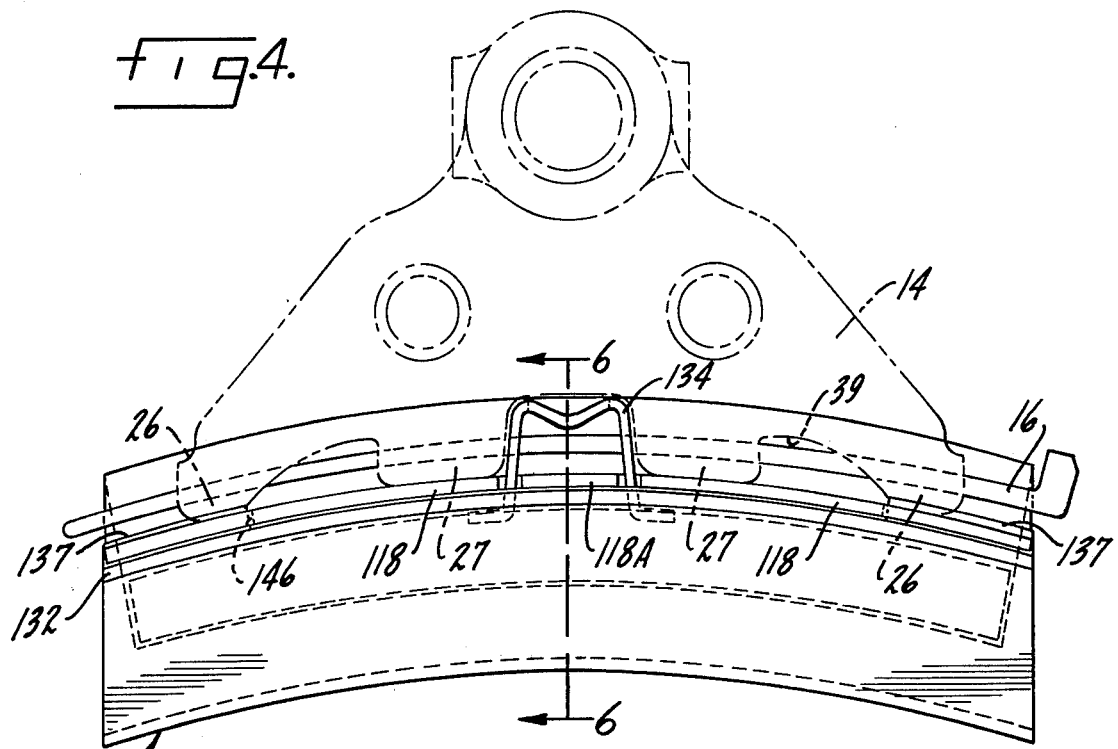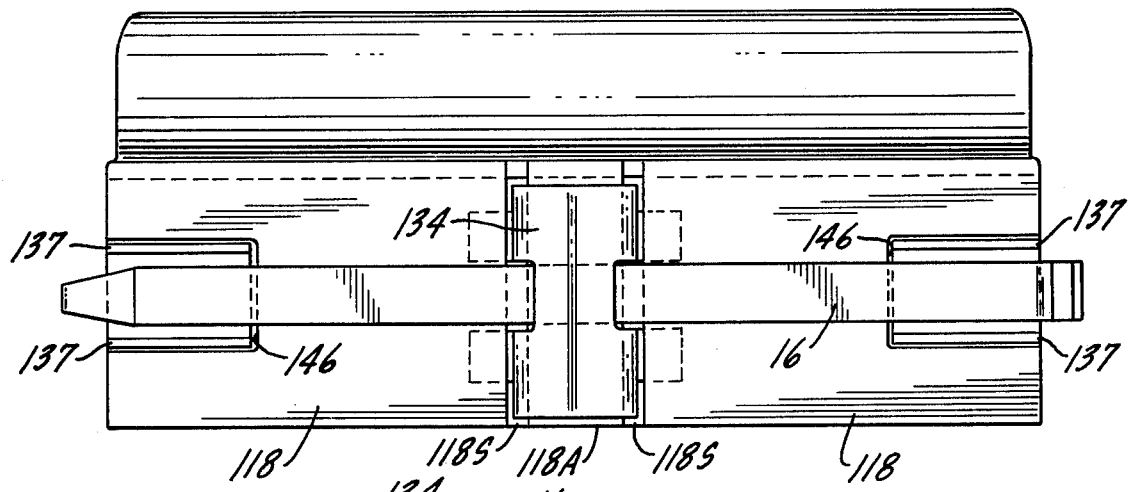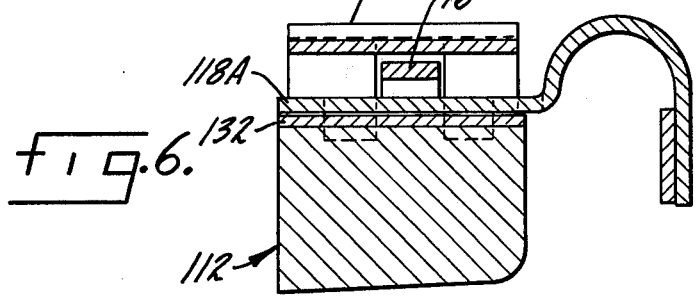

RAILROAD BRAKE SHOES WITH SEPARABLE INSERT ENGAGEABLE WITH FLANGE OF A WHEEL

BACKGROUND AND SUMMARY OF THE INVENTION

This invention relates to a brake shoe for the wheel of a railroad vehicle, both locomotive and car, and in particular to an insert engageable with the flange of the wheel to guide the friction member of the shoe acurately into contact with the tread of the wheel when the brake is applied.

Flange-guided railroad brake shoes have been in use for many years. The characteristic feature is an integral cantilevered guide projecting from one side of the backing plate of the shoe, presenting a slot to fit complementally the flange of the wheel. Because of variance in design for servicing a broad range of railroads, and because of somewhat sporadic demand, cost problems are presented by mold investment, manufacture and maintaining a variant inventory.

The primary object of the present invention is to reduce this cost by making available a flange-guided insert which can be installed at will, interposable between the brake head and the back of a standard (non-guided) shoe. More specifically, it is an object of the present invention to achieve the foregoing objective by so configuring the insert that it can be tightly retained by a standard key and at the same time secured against both longitudinal and lateral displacement.

In recent years there have been considerable changes in brake rigging for railroad vehicles, a change from hangers to unit beams for example. Another object of the invention is to employ a flange-guided insert as a guide to compensate for any loose fit due to a change in the brake rigging.

The objectives are achieved by constructing the insert to include a support plate which presents opposed shoulders for mating or keying the insert to other parts of the brake shoe assembly, thereby to prevent both longitudinal and lateral displacement of the insert. Such other parts may include the backing plate of the shoe itself, the center attaching lug of the shoe, the toe guides associated with the shoe, or a part of the brake head.

It may be desirable to have the respective surfaces which contact the wheel tread on one hand and the wheel flange on the other hand respectively perform different functions. Whereas a high friction contact between the brake shoe and wheel tread is desirable to provide a powerful brake force, a similar high friction contact between the flange guide and wheel flange may not always be satisfactory with certain types of wheels. For example, it may be desirable to provide a wheel flange contact surface of low friction material to simply perform a guiding function to maintain the brake head and shoe in their proper position relative to the wheel flange. In other instances, it may be advantageous to provide a low friction flange contact surface engageable with the wheel flange. Accordingly, it is a further object of the present invention to provide for such variant friction contact surfaces without maintaining a large inventory, as discussed above, simply by supplying inserts which may be varied or selected at will in terms of a pad or liner thereon engageable with the wheel flange, that is, a liner of whatever material is desired over the area of the flange guide which contacts the wheel flange.

A still further object of the present invention is to improve the economies of flanged shoe replacement. With more particularity, it is an object to provide a separable independent flange-guided insert which may be replaced or further utilized without regard to the amount of wear material still available on the brake shoe friction element and vice versa.

BRIEF DESCRIPTION OF THE DRAWING

FIG. 1 is a side view of an entire brake head assembly with the flange-guided insert of the present invention in its installed position.

FIG. 2 is a top view of the structure of FIG. 1 with the brake head removed to clearly expose the flange-guided insert.

FIG. 3 is a section view taken along line 3—3 of FIG. 1.

FIG. 4 is a side view of a brake assembly embodying an alternate form of the present invention.

FIG. 5 is a top view of the structure of FIG. 4, again with the brake head removed to clearly expose the flange-guided insert.

FIG. 6 is a section view taken along line 6—6 of FIG. 4.

DESCRIPTION OF THE PREFERRED EMBODIMENTS

A flange-guided insert 10, constructed in accordance with the present invention, is installed in a conventional brake head assembly consisting of a brake shoe 12 rigidly mounted on a brake head 14 by a key 16. Under the present invention, more specifically in the embodiment of FIGS. 1–3, a separate flange-guided insert 10 is interposed between the brake head and shoe. The flange-guided insert includes three support plates 18 of substantially the same dimensions, a flange guide 20, and an intermediate connecting portion or crown 22. A liner 24 covers the contact area of flange guide 20.

As shown in FIG. 3, the brake shoe friction element has a friction face 10F engageable with the tread T of wheel W when the brake is engaged. Flange guide 20 is adapted to lay along the inner face of flange F and is so spaced from brake shoe 12 as to properly guide it into aligned contact with the tread of the wheel when the brake is applied.

To support the entire brake head assembly, a conventional brake head 14 is provided, as shown in FIG. 1. Longitudinally spaced toes 26 of brake head 14 are adapted to engage the brake shoe in its installed position. Interposed between the brake head toes is a pair of generally U-shaped pads 27 which together partially define a generally arcuate slot or keyway 28 for retainer key 16.

The actual braking contact with the car wheel is made by a replaceable brake shoe 12, basically comprising a body of composition friction material 30 supported on a generally arcuate backing plate 32. A center attaching lug 34 projects from the backing plate for insertion between brake head pads 27. Lug 34 has an opening 36 extending longitudinally therethrough which is so positioned as to be generally aligned with keyway 28 when brake head toes 26 are engaged against the brake shoe backing plate 32. To laterally position the brake shoe in proper engagement with the brake head toes, a pair of laterally spaced toe guides 37 project slightly upward from each end of backing plate 32 for insertion between each pair of laterally spaced brake head toes 26. Brake shoe backing plate 32 is generally metallic, whereas the friction element may be a composition material, (non-metallic) consisting of a resin matrix containing wear particles and friction modifiers.

To rigidly fasten the brake head and shoe together, an elongated and generally bowed key 16 of standard form is inserted through keyway 28, thereby locking the brake head pads and center attaching lug in aligned engagement. A head 38 is formed on one end of the key for hammering the key into the keyway and for prying it out when removing or replacing the shoe.

In a preferred form of the insert shown in FIGS. 1–3, three transverse support plates 18 are longitudinally spaced apart so as to be aligned with relieving transverse pockets 39 afforded by the spaced pads and toes in brake head 14. In this instance, the transverse pockets 39 of the brake head may be utilized to permit the positioning of the support plates 18 between the brake head and shoe without requiring disengagement of toes 26 from backing plate 32. In their inserted positions, the support plates are complementally engaged flush against the backing plate in face to face contact.

To rigidly secure the flange-guided insert in its installed position, locking action is afforded by the normal assembly of the brake head, shoe and key. As best shown in FIG. 1, vertical restraint is achieved principally by the key opposed to the upper surfaces of the plates 18. Longitudinal restraint is achieved by the inner surfaces of the lug 34 opposed to shoulders of the insert presented by the side edges of the medial plate 18; also by the pad and toe surfaces of the brake head opposed to shoulders defined by the adjacent sides of the end plates 18. Lateral restraint, on the other hand, is provided by bent over tabs 40 on the end of the support plate 18 opposite crown 22. As best shown in FIG. 2, tabs 40 engage the outer edge 42 of the brake shoe backing plate to prevent inward lateral displacement of the insert. Likewise, outward lateral displacement if prevented by a bent tab 44 in the center support plate which is adapted to engage one edge of key 16, as best shown in FIG. 3.

To properly space flange guide 20 relative to the brake shoe without interfering with flange F of the wheel, crown 22 is displaced upward and away from one side of the support plates, extending to the dependent end portion referred to as flange guide 20 (FIG. 3). The guide 20 is thus cantilevered from one side of the support and is so configured as to fit over the flange of the wheel. Thus, as the brake shoe friction element wears, flange F will be freely received within the recess provided by the crown 22.

In actual use, lateral forces directed against the brake head assembly tend to laterally shift the position of friction surface 10 F along the wheel tread. To prevent such lateral shifting, these forces are absorbed by flange guide 20. For this reason, a liner 24 is placed along the contact surface of the flange guide to prevent wear and to accomplish other functions as will be described below.

Another embodiment of the present invention is illustrated in FIGS. 4–6. Although a standard brake head 14 and key 16 are employed, center attaching lug 134 of brake shoe 112 is slightly extended vertically (compared to FIG. 1) to account for the insertion of the flange-guided insert between the brake head and shoe. In this instance, two long support plates 118 substantially cover the entire longitudinal area of the brake shoe backing plate 132, except for the medial area covered by a plate 118 A of diminished width to fit the slot of the lug 134. The principal difference from the prior embodiment is that the support plates no longer fit within the recessed pockets 39 of the brake head. Consequently, disengagement of toes 26 from backing plate 132 is required in order to accomodate insertion of the support plates 118 therebetween.

As a result of the alternate form, however, the flange-guided insert of the present invention is adaptable for use with conventional brake heads presently constructed with no transverse relieving pockets or with pockets of various designs. Also, the contact area of vertical restraint afforded by the brake head 14 is substantially increased since toes 26 as well as brake pads 27 bear against the support plates.

Both lateral and longitudinal restraint are afforded by cutout end sections 146 in the outer support plates. The edges or shoulders presented by the cutout end sections bear against the opposing upstanding stop surfaces presented by toe guides 137 thereby restraining motion of the support plates relative to backing plate 124. Likewise, the shoulders afforded by slots 118S, between the medial plate 118A and end plates 118 may be advantageously used to provide further restraint in cooperation with opposed surfaces of lug 134. The spaces between support plates 18 in FIGS. 1 and 2 could likewise be viewed as such slots.

The novel flange-guided insert of the present invention accounts for substantial advantages of economy, function and use. With prior brake shoes, incorporating an integral flanged shoe, a separate inventory of flanged shoes had to be maintained for each type of brake shoes stocked, which, in turn, escalated costs of both manufacture and inventory. A single design of the flange-guided insert of the present invention on the other hand may be adaptable for use with several different types of brake heads. Thus, although it may be desirable to stock more than one type of insert, there will be substantially fewer than the number of different brake shoes and head available. In any event, the inserts are much smaller and more easily stored than duplicated series of non-flanged and integral flanged brake shoes. Furthermore, the novel inserts of the present invention provide a cost savings in use as well as in manufacturing. It is likely that the brake shoe friction element and flange guide liner will have different wear rates due to differences in thickness, function and material. If the brake shoe has a shorter wear life than the flange guide liner, or vice versa, the present invention provides economies of replacement that would not be possible with full one-piece flanged brake shoes wherein the entire product has to be replaced despite further wear material still being available in one area or another. Thus, the insert would not necessarily have to be replaced at the time of a shoe change, but rather may be replaced or not according to its own useful life, determined by the remaining thickness of the liner.

To further demonstrate the flexibility offered by the flange-guided insert of the present invention, materials may be chosen for the wear surface of the liner or flange guide according to specific characteristics to match the need, whether friction or economics, without considering the limitations inherent if such a material were used for a one-piece solid flanged brake shoe. For example, an insert may be provided to act on the flange of a wheel to achieve any one or more of the following functions. In certain circumstances, it may be desirable to provide a surface of low friction material to simply act as a guide for maintaining the brake head and shoe in their proper position relative to the wheel tread. In other applications, it may be desirable to provide additional braking effort which may be accomplished by providing a wear surface of high friction material on the flange guide.

If a liner is attached to accomodate the functional needs described above, material choices for the remainder of the insert are substantial. Since the insert does not support the friction element of the brake shoe and since normally the lateral forces involved are quite low, the material for the separable insert member need not be limited to any particular kind.

The crown 22 need not be arcuate; indeed it may be of square or channel shape. Also, the tabs 40, instead of being integral, may be in the form of stubs welded to the end of each support 18. Further, two tabs 40 may suffice in which event a medial tab may be eliminated.

The use of the flange-guided insert of the present invention on wheels that experience particular problems with uneven wear or overlapped brake shoes can resolve such difficulties without the cost or necessity of standardizing on flanged brake shoes. Using standard shoes, such problems may be corrected in needed locations by insertion of flange-guided inserts. For example, on cars with brake beams it may be corrected in needed locations by insertion of flange-guided inserts. For example, on cars with brake beams it may be necessary to place the flange-guided inserts on only one side of the truck. Conventionally, however, flanged shoes are placed on both sides, if at all.

Thus, there has been provided, in accordance with the present invention, an insert positionable between the brake head and the back of brake shoe in the brake system of a railroad vehicle; also an auxiliary tread engaging surfaces having a coefficient of friction substantially equal to that of the shoe in the event the latter is worn to such an extent that even the back of the shoe is missing. While the invention has been described in conjunction with specific embodiments thereof, it is evident that many alternatives, modifications and variations will be apparent to those skilled in the art in light of the foregoing description. For example, it is particularly apparent that the means for preventing the lateral and longitudinal displacement of the insert relative to the brake head assembly may be varied. Different combinations of mechanical stops are possible, taking advantage of the adjacent edges provided by the assembly. Likewise, holes could be provided in the support plate for receiving matching projections on the shoe backing plate or vice versa; or an opening could be provided in a single support plate to receive and securely engage the center attaching lug. The shape of the guide of the insert may be varied and may be integral with or attached to the support plate and of practically any length desired. The flange liner may be eliminated altogether.

I claim:
1. In a brake head assembly for a railroad vehicle comprising a brake head member having longitudinally spaced toes and generally U-shaped pads interposed therebetween together partially defining a generally arcuate keyway,
a brake shoe having a body of friction material supported on a generally arcuate backing plate member which has toe guides engageable with the toes of the brake head and a lug member projecting from the backing plate, said lug member being insertable between the brake head pads and having an opening therein, so positioned as to be generally aligned with said keyway when the toe guides engage the brake head toes, and
a generally bowed key member insertable into said keyway to fasten the brake head and shoe together in mutual engagement,
the improvement comprising a flange-guided insert insertable between the brake head and brake shoe backing plate, said insert being characterized by:
a support plate engageable complementally with a portion of the backing plate,
said support plate having shoulders therein engageable with opposed surfaces of at least one of said members for preventing both lateral and longitudinal displacement of the insert relative to the brake head assembly, and
a guide cantilevered from one side of the support plate and so configured to fit over the flange of the vehicle wheel, thereby to guide the body of friction material into aligned contact with the tread of the wheel when the brake is applied.

2. The improvement of claim 1 further comprising a liner on said arcuate guide engageable with the flange of the wheel to maintain the brake head and shoe in their proper position relative to the flange, the liner having a coefficient of friction not significantly greater than that of the shoe.

3. The improvement of claim 1 further comprising a liner on said guide engageable with the flange of the wheel to provide additional braking effort, said liner having a coefficient of friction greater than that of the shoe.

4. The structure of claim 1 further comprising spaced apart transverse pockets in the brake head which open toward said brake shoe, and support plates so constructed and spaced apart as to fit within said pockets so that the brake head is directly engageable with the backing plate of the brake shoe with the flange-guided insert installed therebetween.

5. The structure of claim 1 further comprising a plurality of support plates, one of which is so constructed as to tightly fit transversely within the lug projecting from the brake shoe backing plate.

6. The improvement of claim 1 wherein the means for preventing longitudinal displacement of the insert comprises opposing shoulders and stop surfaces on the support plate and brake head member respectively.

7. The improvement of claim 6 further comprising a bent over tab on the end of the support plate opposite the arcuate guide, said tab being engageable with an edge of the brake shoe backing plate to prevent relative lateral displacement of the insert.

8. The improvement of claim 6 further comprising a tab on the support plate engageable against an edge of the key to prevent relative lateral displacement of the insert.

9. A flange-guided brake shoe for a railroad vehicle adapted to be attached to a brake head member and comprising:
a body of friction material supported on a backing plate member which has toe guides at the ends thereof engageable by toes on the brake head;
an attaching lug member projecting from the backing plate member and adapted to fit between center pads on the brake head member, said pads together presenting a slot for a retainer key;

a separate guiding insert positionable between the brake head and the backing plate members, said insert including a support plate engageable complementally with a portion of the backing plate member;

a guide cantilevered on one side of said support and configured to fit the flange of a locomotive wheel thereby to guide the body of friction material into aligned contact with the tread of the wheel when the brake is engaged;

said attaching lug member having an opening therein to receive a key member passed through the slot presented by the brake head pads;

and said support plate presenting spaced opposed shoulders engageable with opposed surfaces presented by selected of said members to prevent both lateral and longitudinal displacement of the insert.

10. An insert according to claim 9 wherein said support plate is slotted, the slots affording shoulders opposed to surfaces of at least one of said members to prevent both lateral and longitudinal displacement of the insert relative to the brake head assembly.

* * * * *